United States Patent [19]

Partain

[11] 4,300,863
[45] Nov. 17, 1981

[54] TOOL SUSPENSION SYSTEM

[76] Inventor: Joe C. Partain, 3070 Oakcliff Rd., Doraville, Ga. 30340

[21] Appl. No.: 180,119

[22] Filed: Aug. 21, 1980

Related U.S. Application Data

[63] Continuation of Ser. No. 974,430, Dec. 29, 1978, abandoned.

[51] Int. Cl.³ .............................................. B23C 1/16
[52] U.S. Cl. ..................................... 409/109; 409/93; 409/97; 409/103
[58] Field of Search .................. 409/103, 86, 93, 108, 409/109, 110, 125, 97; 269/8; 408/234

[56] References Cited

U.S. PATENT DOCUMENTS

| | | | |
|---|---|---|---|
| 495,233 | 4/1893 | Snow | 409/93 |
| 2,303,006 | 11/1942 | Swire | 409/93 |
| 3,171,207 | 3/1965 | Wormser | 409/103 X |
| 3,180,183 | 4/1965 | Stanley et al. | 408/234 X |
| 3,183,780 | 5/1965 | Little | 409/103 |
| 3,307,988 | 3/1967 | Berg | 269/8 X |
| 3,336,551 | 8/1967 | Steap | 269/8 X |
| 3,434,385 | 3/1969 | Ray | 409/109 |
| 3,653,291 | 4/1972 | Babcock | 409/109 |
| 3,777,616 | 12/1973 | Mueller | 409/109 |
| 4,095,633 | 6/1978 | Kimball | 409/109 X |

*Primary Examiner*—William R. Briggs
*Attorney, Agent, or Firm*—Jones, Thomas & Askew

[57] ABSTRACT

A system for suspending a tool for horizontal movement with respect to a workpiece, wherein a carriage carrying said tool is slidably carried on a set of parallel rails, which are in turn slidably carried by a second set of parallel rails at right angles to the first set of rails, to allow motion of the tool along any path in a horizontal plane. The tool suspension system is disclosed in a sign cutting apparatus wherein a template and workpiece are mounted on a work table and the carriage includes a stylus for tracing a pattern on the template to be reproduced in the workpiece by movement of the tool utilizing the suspension system, which is independent of the work table.

2 Claims, 7 Drawing Figures

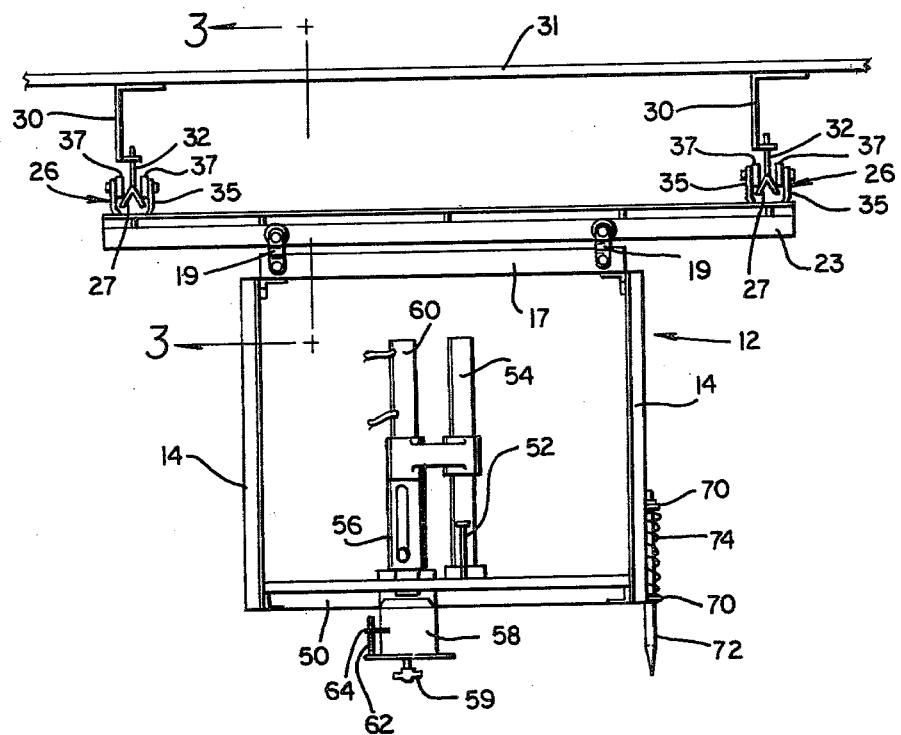
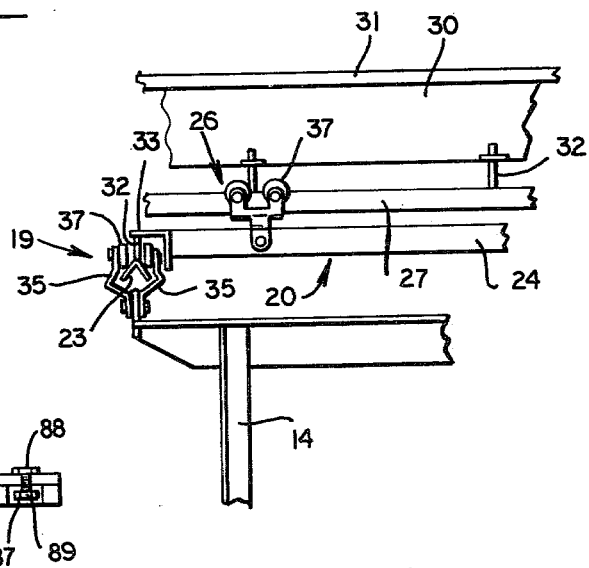

TOOL SUSPENSION SYSTEM

This application is a continuation of application Ser. No. 974,430, filed Dec. 29, 1978, now abandoned.

DESCRIPTION

1. Technical Field

The present invention relates to apparatus for the suspension of tools to allow movement of such tools with respect to a workpiece, and particularly relates to such suspension apparatus which permit horizontal motion of tools such as sign cutting or engraving machines, wherein a pattern traced by a stylus is reproduced in the workpiece.

2. Background Art

Sign cutting, wood carving and engraving machines wherein a template embodying a two or three dimensional design can be traced with a stylus and reproduced by a separate tool arranged to reproduce the motion of the stylus are well known in the art. In order for an operator of such a machine to move both the stylus and tool simultaneously, it is desirable that a suspension system be provided which bears the weight of the stylus and tool, rigidly interconnects them, and allows them to be moved together in the desired paths of motion with minimum effort on the part of the operator.

Prior art suspension systems typically have been fixed to the portion of the machine that rests on the ground or floor surface and provides a means for securing the workpiece and template. Suspension of the stylus and tool typically is provided by a series of members connected by slidable bearings, pivots, and universal joints with counterweights in order to locate and balance the tool over the workpiece and the stylus over the template. Such a machine is shown, for example, in U.S. Pat. No. 957,716, issued to D. Salstrom. Such machines generally provide a capability for vertical movement at the expense of stability in the horizontal plane which is essential to operations such as sign cutting or engraving wherein a flat template is utilized. Furthermore, prior art apparatuses typically are constructed so that the stylus and tool come into contact with the template and workpiece simultaneously. Inaccurate results due to operator error are likely to occur since the operator must lower the stylus precisely onto the template to begin the operation. If the operator's aim is slightly out of line, this is immediately translated into an error in the workpiece which may spoil the workpiece in many cases.

Another problem with machines having suspension systems carried by the structure that also secures the workpiece is that very large workpieces cannot be maneuvered so that the tool can reach all parts of the workpiece. When a workpiece is too large, the structure carrying the tool suspension system limits the portion of the workpiece that can be located under the range of the tool, and therefore large jobs, such as cutting large signs, have been done by cutting separate segments of the sign and subsequently piecing them together.

SUMMARY OF THE INVENTION

Generally described, the present invention provides an apparatus for suspending a tool for horizontal movement with respect to a workpiece comprising a means for securing the workpiece, a carriage including the tool positioned over the workpiece, a carriage suspension means for movably supporting the carriage over the workpiece for movement along a first linear path confined in a horizontal plane, and a means for movably supporting the carriage suspension means for movement along a second linear path at right angles to the first linear path confined in a horizontal plane.

The means for supporting the carriage suspension means includes a first pair of parallel rails mounted horizontally below a support structure which is independent of the means securing the workpiece, and a plurality of first rail-engaging means attached to the carriage suspension means for slidably engaging the first pair of rails. In conjunction therewith the carriage suspension means comprises a frame carried by the plurality of first rail-engaging means, the frame including a second pair of parallel rails at right angles to the first pair of rails, and a plurality of second rail-engaging means attached to the carriage for slidably engaging the second pair of rails. A work table mounted on the floor surface functions as the means for securing the workpiece and the ceiling structure of the room functions as the support structure carrying the suspension system.

A tool suspension system according to the invention has many advantages over the prior art. For example, the range of travel of the tool and stylus is not limited by a connection to the work table holding the workpiece. Therefore very large workpieces may be produced as a result of the independent suspension of the tool and stylus, without piecing together smaller workpieces as was often necessary with prior art machines.

By providing for travel of the carriage holding the tool and stylus along perpendicular pairs of rails, the invention provides great stability in the horizontal plane and is exceptionally well suited for suspending routers for sign cutting or engraving tools. Furthermore, travel along the rails can be accomplished by means of rollers or bearings to allow motion along any straight or curved path in the horizontal plane with less friction than is encountered in pivots and joints typically found in the prior art. Thus, although the movement of the tool provided by the present suspension system is exceptionally stable in the horizontal plane, movement of the carriage by the operator is accomplished with very little effort.

Another feature of the invention provides for adjustment of a tool with respect to the carriage, to further extend the potential working area. Also, the stylus and tool may be independently raised and lowered, so that the stylus may be located positively with respect to the template before the tool is lowered, so that the tool is also precisely located prior to engaging the workpiece. A novel clamping means for the workpiece is provided whereby air operated cylinders bias stops against the workpiece. A novel system is also provided for locating and maintaining the position of the template, whereby a pair of longitudinally extending stops are selectively securable to a metal template-holding surface by passing bolts through the stops into nuts traveling within T-shaped slots in the surface to prevent transverse movement of the template, and whereby longitudinal movement of the template is restrained by magnets placed adjacent the sides of the template as it rests on the metal surface.

Thus, it is an object of the present invention to provide an improved tool suspension apparatus having improved horizontal stability and ease of operation.

It is a further object of the invention to provide an apparatus for suspending a stylus and a workpiece independently with respect to a template and workpiece, respectively, which are engaged by the stylus and tool.

It is a further object of the invention to provide a suspension system for a tool and stylus whereby the stylus may engage a template prior to the tool engaging the workpiece.

It is a further object of the invention to provide a suspension system for a tool wherein the tool is carried by a carriage suspended from perpendicular pairs of rails for travel along any path in a horizontal plane.

BRIEF DESCRIPTION OF THE DRAWING

FIG. 2 is a side view of the tool suspension system shown in FIG. 1.

FIG. 3 is a detail view of the roller assemblies of the suspension system according to the invention taken along line 3—3 of FIG. 2.

FIG. 6 is a cross-sectional view of the stop mechanism for locating the template according to the present invention.

DESCRIPTION OF THE PREFERRED EMBODIMENTS

Figure 1:
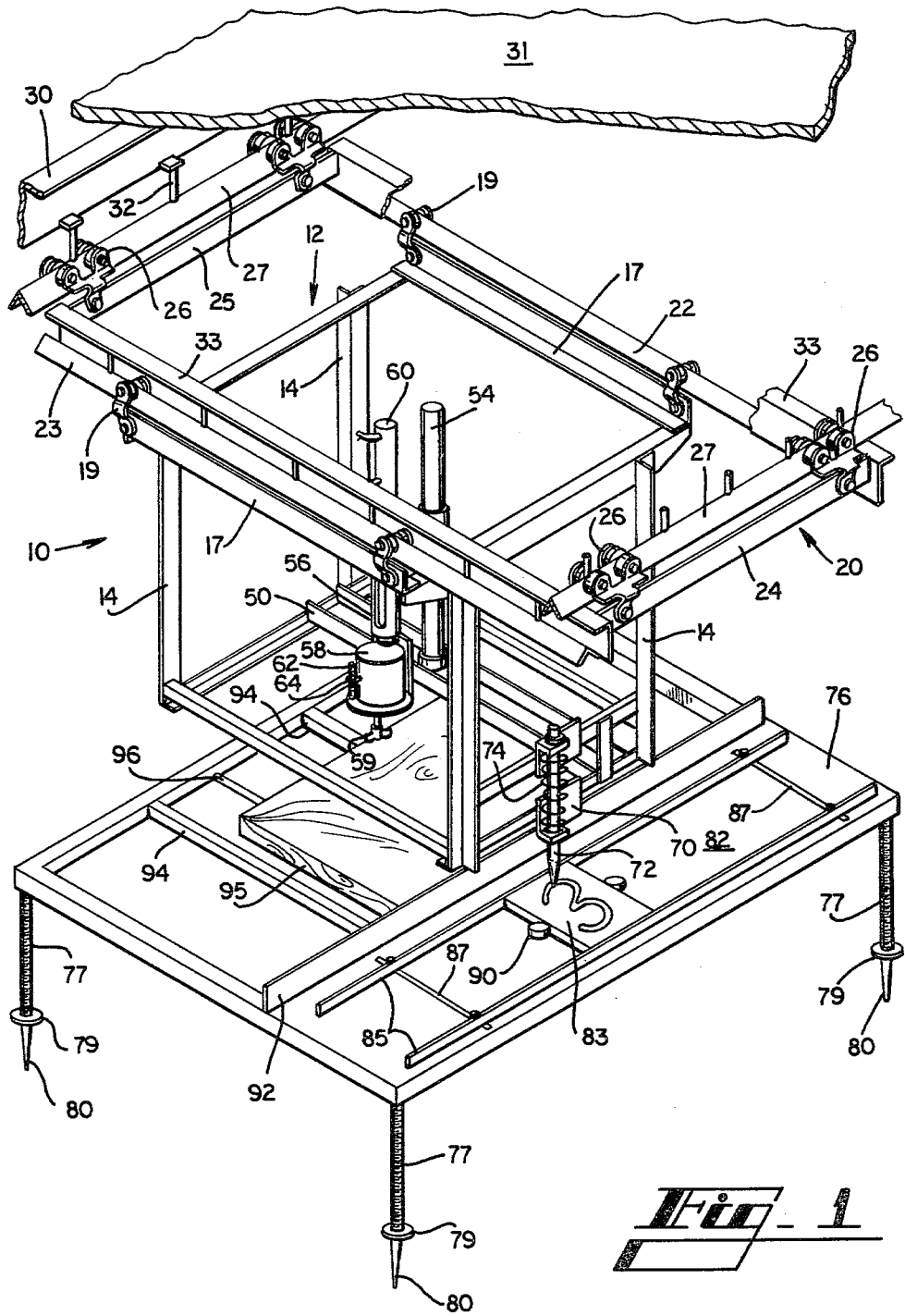
FIG. 1 is a perspective view of a tool suspension system according to the present invention.
Figure 4:
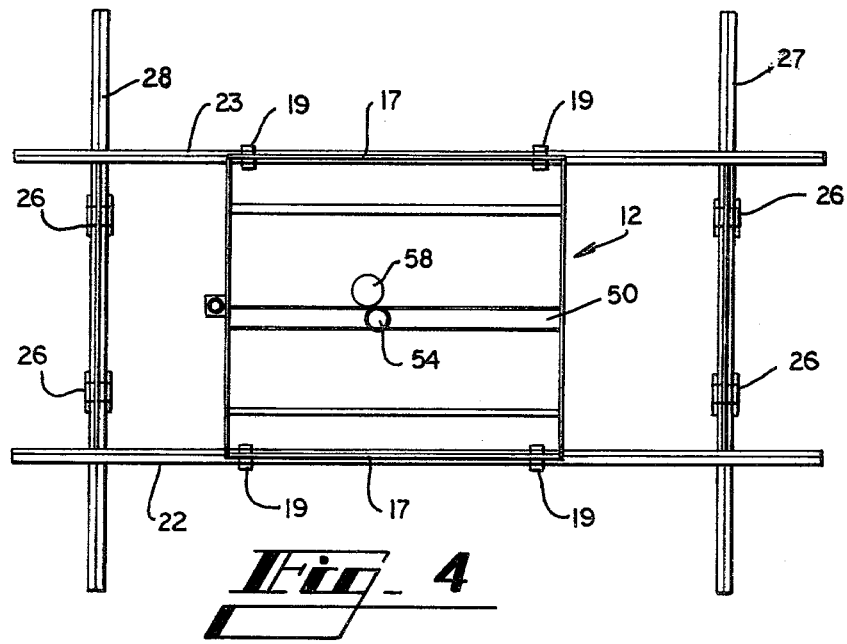
FIG. 4 is a bottom view of the tool suspension system according to the present invention.

Referring now in more detail to the drawing, in which like numerals represent like parts throughout the several views, FIG. 1 shows a tool suspension apparatus 10 according to the invention. A carriage 12 is defined by a box-like rectangular frame 14. A roller assembly 19 extends from each corner of the frame 14 and opposite pairs of roller assemblies 19 are connected by braces 17 to provide further stability. A carriage suspension frame 20 includes a pair of transverse rail suspension brackets 33 connected by crossbars 24 and 25. The rail suspension brackets each carry a transverse rail 22 and 23, as shown in FIG. 3. The roller assemblies 19 fixed to the carriage 12 engage the transverse rails 22 and 23 to provide transverse movement of the carriage along a linear path confined in a horizontal plane. Each of the crossbars 24 and 25 carries two additional roller assemblies 26. The roller assemblies 26 engage a pair of parallel longitudinal rails 27 and 28 which are carried by a ceiling mount 30 fixed to a ceiling 31 of a room in which the apparatus is located. The transverse rails 22 and 23 are at right angles to the longitudinal rails 27 and 28.

As shown in FIG. 3, the rails 22, 23, 27 and 28 have the cross-section of an inverted "V". The longitudinal rails 27 and 28 are hung from the ceiling mount 30 by rail support pins 32 fixed to the point of the inverted "V". The transverse rails 22 and 23 are similarly hung by rail support pins 32 from the transverse rail suspension brackets 33 to which the crossbars 24 and 25 are attached. The roller assemblies 19 and 26 include a roller axle bracket 35 which surrounds the rails 22, 23, 27 and 28, and carries a plurality of rollers 37 which bear upon the upper slanted surfaces of the rails.

The linear path of travel provided by the roller assemblies 19 and 26 running along inverted "V"-shaped rails may alternately be provided by other bearing arrangements within the concept of the invention. For example, sleeve bearings running along cylindrical rails, comprising either plain bearings or ball bushings, could be utilized.

The carriage 12 includes a track 50 extending in the transverse direction along the bottom of the frame 14 from one end of the carriage to the other. A clamp 52 travels along the track 50 and can be secured in any selected position along the track 50. To the clamp 52 is attached a tool mount 54 which in turn suspends a router mount 56 alongside the track 50. The router mount 56 carries a router 58 in a manner so as to provide for vertical motion of the router 58 with respect to the router mount 56. A pneumatic cylinder 60 is fixed atop the router mount 56 to move the router 58 downward when compressed air is applied to the cylinder. The depth of downward movement of the router 58 can be controlled by adjusting a stop nut 64 on a threaded rod 62 fixed to the router. When the router 58 is biased in a down position, a router bit 59 extends below the frame 14 to engage a workpiece 95, shown as a wooden board.

The carriage 12 also includes a pair of brackets 70 fixed to one end of the carriage 12 for carrying a stylus 72 for selective slidable vertical movement. A spring 74 biases the stylus downward to a lowered position wherein the stylus 72 extends below the carriage 12. For convenience, the stylus 72 can be maintained in a raised position by hooking a stop (not shown) on the stylus to one of the brackets 70.

The carriage 12 is suspended over a work table 76 which is carried on legs 77 resting on a floor. The legs 77 threadably receive a foot 80 so that the level and height of the table 76 can be adjusted by screwing or unscrewing the feet 80 using a knurled knob 79 attached to each foot. Along the side of the table 76 corresponding to the end of the carriage 12 carrying the stylus 72 is a metal template holding surface 82. A template 83 is located upon the surface 82 such that a stylus 72 can engage a pattern in the template 83 when the stylus 72 is extended downwardly below the carriage 12. Transverse movement of the template 83 is prevented by a pair of longitudinally extending stops 85. The stops 85 may be adjusted by moving them perpendicularly to their length across the surface 82. A plurality of bolts 88 pass through the stops 85 and threadably engage a plurality of nuts 89 which travel in a plurality of inverted "T" slots 87 within the surface 82, the slots 87 extending transversely beneath the surface 82 as shown in FIG. 6. Longitudinal movement of the template 83 along the metal surface 82 is prevented by placing two magnets 90 against opposite sides of the template 83 as shown in FIG. 1.

Figure 5:
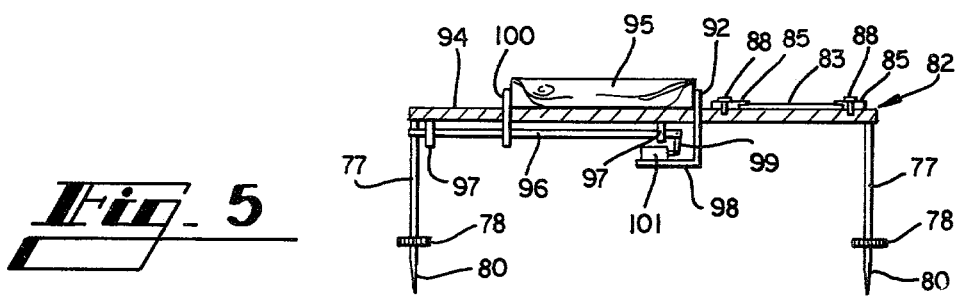
FIG. 5 is a side cross-sectional view of the table securing the workpiece according to the present invention.

The remaining portion of the table 76 not occupied by the template holding surface 82 is partially open and is traversed by a plurality of bars 94. The workpiece 95 rests on the bars 94 and is placed up against a longitudinally extending fixed stop 92 which also extends above the surface of the table 76. As shown in FIG. 5, the workpiece 95 is clamped against the fixed stop 92 by plurality of movable stops 100. Each movable stop 100 is fixed to a rod 96 extending in a transverse direction parallel to and below the bars 94. Each rod 96 is slidably carried by a pair of bearings 97 for slidable movement toward and away from the fixed stop 92. A cylinder support bracket 98 carries a pneumatic cylinder 101 beneath the table 76, and a link 99 connects the cylinder 101 to the rod 96. When compressed air from a source (not shown) is applied to the cylinder 101, the cylinder causes the rod 96 to move toward the stop 92 until the movable stop 100 engages the workpiece 95 and biases the workpiece 95 against the fixed stop 92.

Operation of the preferred embodiment just described is accomplished as follows: a workpiece 95 is placed on the bars 94 of the table 76 against the fixed stop 92. Compressed air is then applied to the cylinder 101 to bias the movable stop 100 against the workpiece 95 to clamp it in position against the fixed stop 92. A template 83 embodying the design desired to be reproduced in the workpiece is placed on the template holding surface 82 of the table 76 in a position such that the router bit 59 is located with respect to the workpiece 95 at the same point that the stylus 72 is located with respect to the template 83. The template 83 is secured by sliding the stops 85 against the top and bottom of the template and tightening the bolts 88, and by placing a magnet 90 against either side of the template 83. With the router 58 in a raised position, the stylus 72 is lowered onto the template and the carriage 12 is moved along the rails 22, 23, 27 and 28 until the point of the stylus rests on the template 83 at the beginning point of the pattern to be reproduced. It will be understood that by pre-positioning the stylus 72, the router has also been precisely positioned prior to engaging the workpiece.

When the carriage is thus aligned, compressed air is applied to the cylinder 60 to lower the router 58 and hold the router bit 59 in a cutting position engaging the workpiece 95. The operator grasps the stylus 72 and moves it to follow the pattern on the template 83. Because of the low-friction travel of the carriage provided along the rails 22 and 23 in the transverse direction and the rails 27 and 28 in the longitudinal direction, the carriage 12 glides along any straight or curved path dictated by the motion of the stylus 72, with minimum effort on the part of the operator. The router bit 59 cuts a consistently accurate reproduction of the pattern on the template 83 into the workpiece 95. The depth of cut of the router bit 59 may be adjusted by changing the position of the stop nut 64 on the threaded rod 62 attached to the router 56, the lowest downward travel of the router bit 59 being limited by the stop nut 64.

If the workpiece 95 is so large as to extend to the rear of or even beyond the rear edge of the table 76, the router 58 may be moved along the track 50 toward the rear of the carriage 12 by loosening the clamp 52. Also, the rails 22, 23, 27 and 28 can be extended beyond the boundaries of the table 76. In this way access to remote portions of the workpiece 95 can be gained. Templates of various sizes are also easy to accommodate by loosening the bolts 88 securing the longitudinal stops 85 to the template holding surface 82 and sliding the longitudinal stop assemblies along the slots 87 in order to provide the required distance between the two stops 85. Longitudinal movement of any size template can easily be accommodated by moving the magnets 90.

It will be understood from the foregoing description that the vertical movement of the stylus 72 is independent of vertical movement of the router 58 and the router bit 59 during operation of the apparatus as well as during initial alignment thereof. Therefore, any vertical shift of the stylus during operation caused by the operator or by irregularities in the template 83 has no effect on the depth of cut of the bit 59, which cuts a smooth path at a uniform set depth throughout the operation of the apparatus. When the cutting of the workpiece 95 is finished, the router 58 can be raised above the workpiece by operation of the cylinder 60 while the stylus 72 is still precisely positioned with respect to the template 83. This prevents any inadvertent inaccurate cutting of the workpiece 95 during disengagement of the router bit 59 from the workpiece 95.

It is preferable to have pneumatic controls (not shown) for operating the air cylinders 60 and 101 located within easy reach of the operator. For example, a trigger control (not shown) for the cylinder 60 operating the router 58 can be attached to the frame 14 near the stylus 72. A trigger control (not shown) for the cylinder 101 may be located near the vertical stop 92 at about the center of the table 76 for easy access. Those skilled in the art will understand that regulator valves for reducing the line pressure between the air compressor (not shown) and the cylinders 60 and 101 are required and can be located at any convenient location. Hoses (not shown) carrying compressed air to the cylinders 60 and 101 must be hung freely so as not to restrict the motion of the carriage 12.

Figure 7:
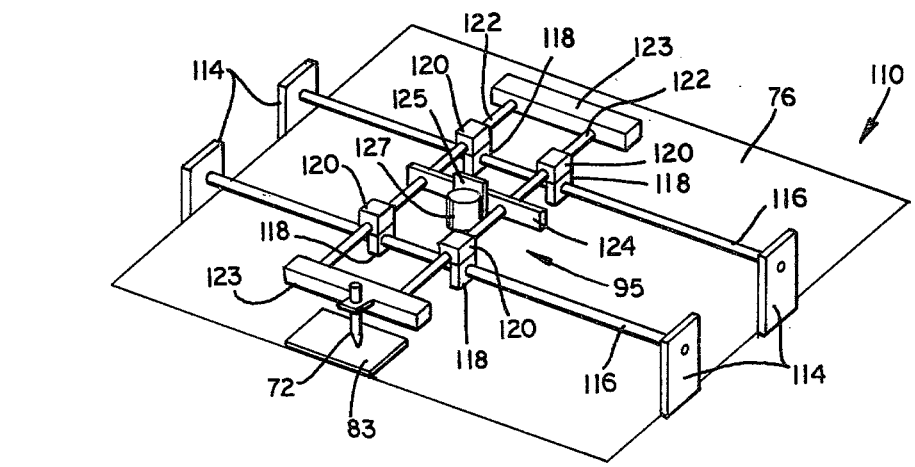
FIG. 7 is a perspective view of a second embodiment of an improved tool suspension apparatus according to the present invention.

A second embodiment of the present invention is shown in FIG. 7, which shows a tool suspension apparatus 110 wherein the tool suspension system is fixed to the table 76. A pair of parallel longitudinal rails 116 are mounted above the table 76 in a horizontal plane by rail supports 114. Each longitudinal rail 116 is engaged by a pair of longitudinal sleeve bearings 118, to the top of each of which is fixed a transverse rail sleeve bearing 120. A pair of transverse rails 122 are carried by the bearings 120. One transverse rail 122 passes through two of the transverse rail sleeve bearings 120 such that the two transverse rails 122 are parallel. A pair of end brackets 23 join the transverse rails 122 in their parallel spaced relation to form a carriage suspension frame. A carriage 124 is provided by means of a bracket straddling the transverse rails 122 and fixed thereto midway along each transverse rail 122. The carriage 124 carries a tool mount 125 and a router mount 127 in a manner similar to that described above for the embodiment shown in FIG. 1. A stylus 72 is mounted on one of the end brackets 123 and vertical motion of the stylus is provided for as described hereinabove. A template 83 is located beneath the stylus 72, also as described hereinabove. It will thus be seen that the embodiment of the invention shown in FIG. 7 also provides for stable and accurate movement of the router in a horizontal plane, by providing rigid support for one pair of rails allowing motion along a linear path in a horizontal plane and a second pair of parallel rails allowing perpendicular linear motion in a horizontal plane. Operation of the tool suspension apparatus 110 shown in FIG. 7 is accomplished in substantially the same manner as described hereinabove for the embodiment shown in FIG. 1.

It should be understood that tools other than a router can be mounted on the tool mounts 54 and 125. For example, the pattern traced by the stylus 72 could be reproduced by a jig saw or a spray gun applying paint to the workpiece 95 or a laser beam cutting or burning a workpiece. The tool suspension apparatus 10 or 110 could further be used for sanding the workpiece, planing or milling the workpiece, or for assembly work such as fastening, riveting, stapling, welding and the like. The preferred embodiment of the invention wherein the tool suspension system is completely independent of the table 76 is particularly suited for the use of a variety of tools because the size of the workpiece that can be accommodated is virtually unlimited.

It is further contemplated that a tool assembly mounted on the tool mount 54 could provide for vertical movement of the working portion of the tool. Such an addition would increase the versatility of the entire apparatus while retaining the stability of horizontal motion provided by the invention as described herein.

While this invention has been described in detail with particular reference to preferred embodiments thereof, it will be understood that variations and modifications can be effected within the spirit and scope of the invention as described hereinbefore and as defined in the appended claims.

I claim:

1. An apparatus for reproducing a pattern embodied in a flat template in a horizontal workpiece comprising:
   a work table including means for securing said workpiece and means for securing said template in fixed relation to said workpiece;
   a pair of longitudinal rails suspended from a ceiling member in spaced apart parallel relation;
   a horizontally extending carriage suspension frame movably suspended below said longitudinal rails by a plurality of roller assemblies engaging said longitudinal rails;
   a pair of transverse rails suspended below said carriage suspension frame in spaced apart, parallel relation at right angles to said longitudinal rails;
   a carriage movably suspended below said transverse rails by a plurality of roller assemblies engaging said transverse rails, said transverse and longitudinal rails being sized to allow movement of said carriage transversely in either direction beyond said longitudinal rails and longitudinally in either direction for a distance greater than the distance between said transverse rails;
   a stylus mounted adjacent to an edge of said carriage for selective vertical movement from a position above said template to a position engaging said template;
   biasing means for urging said stylus toward said template;
   catch means selectively engagable for holding said stylus above said template;
   a tool mounted in a tool support, said tool support being mounted for sliding movement along a track extending horizontally away from said stylus and being fixedly mounted to said carriage;
   means for selectively locking said tool support to said carriage to fix the distance between said tool and said stylus; and
   means for selectively moving said tool with respect to said tool mount, independently of the vertical movement of said stylus, from a position above said workpiece to a position engaging said workpiece.

2. The apparatus of claim 1 wherein said means for securing said template comprises
   a longitudinally extending horizontal metal surface;
   a plurality of inverted T-shaped slots in said metal surface transverse thereto;
   a pair of longitudinally extending stops for preventing transverse movement of sid template, selectively securable to said surface by bolts passing through said stops into nuts travelling within said slots; and
   a pair of magnets adhering to said metal surface on either side of said template to prevent longitudinal movement thereof.

* * * * *